United States Patent [19]

Suzuki

[11] Patent Number: 5,303,175
[45] Date of Patent: Apr. 12, 1994

[54] FLOATING POINT ARITHMETIC UNIT

[75] Inventor: Hiroaki Suzuki, Hyogo, Japan

[73] Assignee: Mitsubishi Denki Kabushiki Kaisha, Tokyo, Japan

[21] Appl. No.: 98,984

[22] Filed: Jul. 29, 1993

[30] Foreign Application Priority Data

Aug. 10, 1992 [JP] Japan .................................. 4-212785

[51] Int. Cl.⁵ .............................................. G06F 7/38
[52] U.S. Cl. ..................................... 364/748; 364/745
[58] Field of Search .................... 364/748, 745, 715.04

[56] References Cited

U.S. PATENT DOCUMENTS 4,954,978  9/1990  Terane et al. ................... 364/715.01
5,257,215  10/1993  Poon ............................... 364/748 X

FOREIGN PATENT DOCUMENTS 3-257630  11/1991  Japan .

OTHER PUBLICATIONS

*Computer Architecture: A Quantitative Approach*, by David A. Patterson, et al, pp. A18–A19, 1990.

*Primary Examiner*—Tan V. Mai
*Attorney, Agent, or Firm*—Lowe, Price, LeBlanc & Becker

[57] ABSTRACT

The number of zeroes in an operation result of 54 bits is counted by a priority encoder 2 on a three-bit basis. A 54×18 normalization shifter 3 normalizes the operation result in response to the counted result. An LSB determination logic 4 determines a position of the LSB shifted by overflow and underflow, according to a logic state of the most significant three bits of the operation result, and an increment signal generating portion 5 and a three-bit input incrementer 6 add 1 corresponding to the shifted LSB to generate a round-up signal. A 54×3 normalization shifter 9 selectively normalizes a processed result of a lost-significant bit processing portion B or that of a round processing portion A. Normalization shifters of the lost-significant bit processing portion constitute a two stage structure, in which the normalization shifter in the final stage also serves for the rounding processing portion, and a normalization shifter in the succeeding stage of an arithmetic operation portion is omitted. Consequently, a floating point arithmetic unit with the reduced volume of hardware can be provided without reducing the operation speed.

14 Claims, 7 Drawing Sheets

FIG. 4

```
                          ↓LSB
OVERFLOW    1 1 1 0 1 0 1 0 1 1    ··· ARITHMETIC OPERATION RESULT
         +              1 0 0      ··· INCREMENT SIGNAL
         ─────────────────────
            1 1 1 0 1 0 1 1 1 1
```

```
                          ↓LSB
NO FLOW     0 1 1 0 1 0 1 0 1 1
         +              0 1 0
         ─────────────────────
            1 1 1 0 1 0 1 1 0 1
```

```
                          ↓LSB
UNDERFLOW   0 0 1 0 1 0 1 0 1 1
         +              0 0 1
         ─────────────────────
            1 1 1 0 1 0 1 1 0 0
```

FLOATING POINT ARITHMETIC UNIT

BACKGROUND OF THE INVENTION

1. Field of the Invention

The present invention relates to floating point arithmetic units having a rounding processing function, and particularly to a structure of a floating point arithmetic unit for reducing the amount of hardware, and circuitry required therefor.

2. Description of the Background Art

A floating point arithmetic operation having a rounding processing function must handle two kinds of processing, processing of rounding and processing of lost-significant bit caused by subtraction after an arithmetic operation, for the following reason. In an operation result from which significant bits are lost, at least three zeroes are arranged in sequence from the most significant bit, so that zeroes are arranged in the lower bits when the operation result is normalized (shifted to the left). Accordingly, in the case of lost-significant bit, rounding-down is performed irrespective of a rounding processing mode, whereby the rounding processing and the lost-significant bit processing do not conflict with each other. It is thus necessary, in a conventional floating point arithmetic unit, to arrange respective processing systems independently.

FIG. 6 is a schematic diagram showing an operational processing block for a mantissa part in such a floating point arithmetic unit.

Here, an operation of a double format of the IEEE standard for floating point arithmetic, which is a representative standard of a floating point arithmetic processor, will be described as one example. In the IEEE standard, the significant bit width of a mantissa part is determined to be 54 bits.

The floating point arithmetic unit shown in FIG. 6 includes an arithmetic operation portion 13, a rounding processing portion A, and a lost-significant bit processing portion B. Arithmetic operation portion 13 performs arithmetic operation for a mantissa part of floating point data. The arithmetic operation result is transmitted through a bus 21 to rounding processing portion A and lost-significant bit processing portion B.

Rounding processing portion A includes a 54×3 normalization shifter 16, an incrementer 17, a 54×2 normalization shifter 18, rounded signal/lost-significant-bit signal determination logic 19 determining which of a rounding processing mode and a lost-significant bit processing mode is designated, and a selector 20. 54×3 normalization shifter 16 shifts an operation result of arithmetic operation portion 13 to the left to normalize the same. Specifically, 54'3 normalization shifter 16 shifts the operation result so that "1" is located on the most significant bit of its mantissa part, to generate a round-down signal. Incrementer 17 adds "1" to the least significant bit of the operation result normalized by 54×3 normalization shifter 16 to generate a round-up signal. 54×2 normalization shifter 18 normalizes the round-up signal from incrementer 17, without any modification or shifting by one bit. The operation result normalized by 54×2 normalization shifter 18 is applied to selector 20 through a data bus 24. Rounded signal/loss-significant bit determination logic 19 provides to selector 20 a control signal for selecting the round-up signal or the round-down signal applied through a bus 23 or bus 24 in the rounding processing mode. Selector 20 having its input portion connected to buses 22–24 selects one of the buses in response to the control signal from rounded signal/lost-significant bit determination logic 19.

Lost-significant bit processing portion B includes a priority encoder operating on a single bit basis and a 54×54 bit normalization shifter 15. Priority encoder 14 counts the number of zeroes of the operation result from arithmetic operation portion 13, in sequence from the most significant bit. 54×54 bit normalization shifter 15 shifts the operation result of arithmetic operation portion 13 to the left to normalize the same in response to the counted result of priority encoder 14.

In the conventional operation processing block shown in FIG. 6, algorithm described by David A. Patterson and John L. Hennessy in *Computer Architecture: A Quantitative Approach* pp. A18-19 is replaced by a hardware, which is extracted mainly with respect to rounding operation processing of a mantissa part.

The operation of the operation processing block shown in FIG. 6 will now be described with respect to rounding processing and lost-significant bit processing. In rounding processing, an operation result of arithmetic operation portion 13, in which overflow or 1-bit underflow might occur, is initially normalized by 54×3 normalization shifter 16, and thereafter, is subjected to rounding processing. The data after the normalization is taken as a round-down signal, and a round-up signal is calculated by incrementer 17. Incrementer 17 constituted of a half adder adds "1" to the least significant bit of the input data to provide the result. 54×2 normalization shifter 18 carries out normalization again for the case of overflow which might be caused by the round-up operation, to obtain a round-up signal. Finally, either of the output signal of 54×3 normalization shifter 16 corresponding to a round-down signal, and the round-up signal provided from 54×2 normalization shifter 18 is selected, so that the rounding processing is implemented.

In lost-significant bit processing, a path for lost-significant bit processing is completely independent of that for the aforementioned rounding processing. Selector 20 in the final stage selects a signal by discriminating between the lost-significant bit processing and the rounding processing. In this processing, priority encoder 14 counts the number of zeroes in the upper bits of the operation result of arithmetic operation portion 13, and 54×54 normalization shifter 15 in the next stage shifts the operation result of arithmetic operation portion 13 by the counted number of zeroes. As a result, "1" is positioned at the most significant bit of the mantissa part in the operation result of arithmetic operation portion 13.

As described above, three normalization shifters 15, 16 and 18 for 54×59 (=54×54+54×3+54×2) bits, and priority encoder 14 for counting zeroes on a single bit basis are required in the conventional structure.

FIG. 7 is schematic diagram showing in detail the circuit of priority encoder 14 shown in FIG. 6. A circuit having the same structure as in priority encoder 14 shown in FIG. 6 is described, for example, in U.S. Pat. No. 4,785,421, Nov. 15. 1988, Sheet 1, FIG. 2. In FIG. 7, priority encoder 14 includes encoder circuits C0–C53 corresponding to 54 bits of the mantissa part, and connected in series. Encoder circuit C53 includes an inverter 30 receiving input data 153 of the most significant bit (MSB), NMOS transistors 28 and 29, and an AND gate 27 providing the encoded result of the MSB. Inverter 30 has its output node connected to the gate electrode of NMOS transistor 28. NMOS transistor 28 has one electrode connected to a power supply terminal 31, and the other electrode connected to one electrode of NMOS transistor 28 of encoder circuit C52 in the next stage. NMOS transistor 29 has its gate electrode connected so as to receive the input data I53, one electrode connected to a ground potential, and the other electrode connected to one electrode of NMOS transistor 28 of encoder circuit C52 in the next stage. AND gate 27 has one input node connected to power supply terminal 31, and the other input node connected so as to receive the input data I53. Encoder circuit C0 includes an AND gate 33 receiving input data I0 of the least significant bit (LSB) and input data I1 from encoder circuit C1. Respective encoder circuits C1–C52 have the same structure as that of encoder circuit C53, and connected so as to receive a signal from the preceding stage instead of a signal from power supply terminal 31. That is, encoder circuits C1–C53 have respective NMOS transistors 28 connected in series.

In operation, when the input data I53 of the MSB is 0, NMOS transistor 28 is turned on, and NMOS transistor 29 is turned off. Power supply potential 31 is applied to an input node of AND gate 27, so that output node O53 attains a high level. When the input data 153 is 1, NMOS transistor 28 is turned off, and NMOS transistor 29 is turned on. Output node O53 attains a low level, as well as an output node O52 of the adjacent encoder circuit C52 attaining a low level. A signal at a high level is propagated through NMOS transistor 28 to the encoder circuit in the next stage.

Priority encoder circuit 14 is thus structured and operated, thereby providing sequentially outputs of a high level in the case of sequential input of "0"s from the most significant bit, and providing outputs of a low level from the lower encoder circuits in the case of input of "1"s.

As described above, in the conventional operation block for a mantissa part, overflow and underflow accompanied by operation processing make a hardware structure of the rounding processing portion complicated, causing increase in the amount of hardware in a normalization shifter. In order to solve this problem, it can be considered to reduce the number of priority encoders and normalization shifters, divide the operation result of the arithmetic operation portion into a plurality of groups of bits, and process the operation result for each group. In this case, however, the problem arises that the number of operations increases, resulting in decrease of operation processing speed.

SUMMARY OF THE INVENTION

An object of the present invention is to reduce the amount of hardware without lowering a speed of operational processing, in a floating point arithmetic unit having a rounding processing function and a lost-significant bit processing function.

Briefly, a floating point arithmetic unit in accordance with the present invention includes an arithmetic operation portion performing an arithmetic operation for a mantissa part of floating point data, a counter, a first normalizer, a rounding processor, and a second normalizer. The counter counts the number of zeroes arranged in sequence from the most significant bit in the operation result from which information is lost by the arithmetic operation. The first normalizer normalizes the operation result from which information is lost in response to the counted-result of the counter. The rounding processor carries out rounding processing of the operation result in consideration of overflow and 1-bit underflow in the arithmetic operation result of the arithmetic operation portion. The second normalizer normalizes the operation result normalized by the first normalizer or the operation result subjected to rounding processing by the rounding processor.

In operation, an operation result from which significant bits are lost can be processed by the first normalizer and the second normalizer which is also used in the rounding processing. Additionally, the number of normalization shifters can be reduced by one from that in the conventional device, since the operation result subjected to rounding processing without normalization after the arithmetic operation is normalized by the second normalizer. This will drastically reduce the amount of hardware. In lost-significant bit processing, the counter counts the number of zeroes in the upper bits of the operation result from which information is lost for each partial data of a plurality of bits, whereby a smaller priority encoder than that counting on a single bit basis can implement the processing. Moreover, counting for each partial data of a plurality of bits reduces time required for encoding, whereby time required for an operation will not be so long as in the conventional device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing an operation image of the three-bit input incrementer shown in FIG. 3.

DESCRIPTION OF THE PREFERRED EMBODIMENTS

Figure 1:
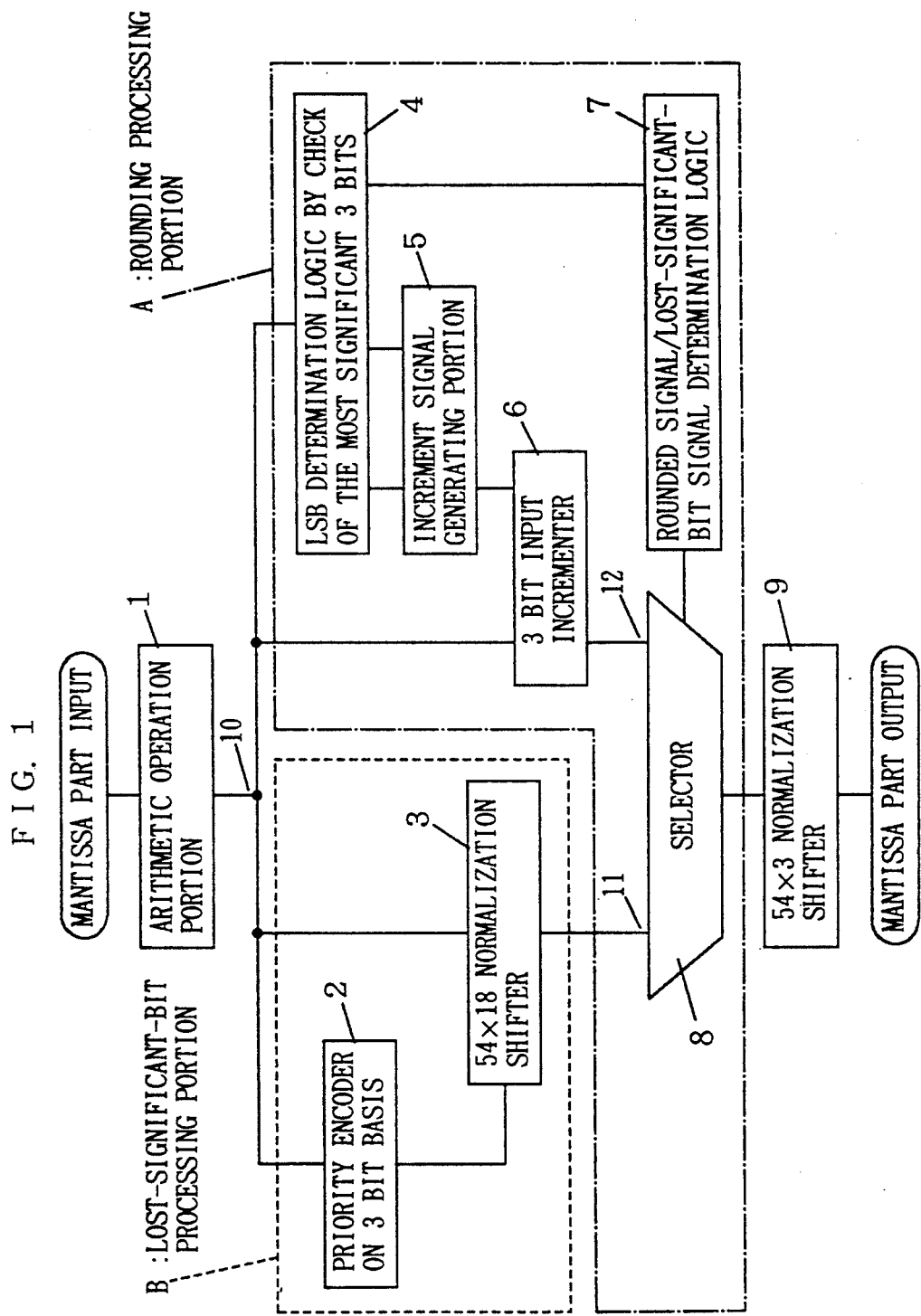
FIG. 1 is a block diagram showing processing of a mantissa part in a floating point arithmetic unit in accordance with one embodiment of the present invention.

FIG. 1 is a schematic diagram showing an operational processing block of a mantissa part in a floating point arithmetic unit of one embodiment of the present invention. Here, an operation in a double precision format of the IEEE floating point arithmetic standard will be described as an example. In FIG. 1, the floating point arithmetic unit includes an arithmetic operation portion 1, a rounding processing portion A and a lost-significant bit processing portion B. Arithmetic operation portion 1 has the same structure as that of arithmetic operation portion 13 shown in FIG. 5, and operates in the same manner. Lost-significant bit processing portion B includes a priority encoder 2 on a three bit basis, and a 54×18 bit normalization shifter 3. Rounding processing portion A includes an LSB determination logic 4 checking a sequence of zeroes in the most significant three bits to determine a position of the LSB, an increment signal generating portion 5, a three-bit input incrementer 6, a rounding/lost-significant bit determination logic 7, and a selector 8. A 54×3 normalization shifter 9 is shared by rounding processing portion A and lost-significant bit processing portion B. 10 indicates a bus for output of an operation result of an arithmetic operation, 11 indicates a bus shared for output of a result of lost-significant bit processing and output of a round-down signal of rounding processing portion A, and 12 indicates a bus for output of a round-up signal generated by three bit input incrementer 6.

The present invention is mainly constituted of a semiconductor integrated circuit device, aiming to reduction of the lay-out area by effective utilization of hardware without lowering its speed performance. First, two stage constitution of normalization shifters in lost-significant bit processing portion B enables 54×18 normalization shifter 3 and 54×3 normalization shifter 9 to be substituted for a 54×54 normalization shifter required in one stage constitution. In this case, in spite of increase in the number of normalization shifters, reduction in the size of each normalization shifter results in total reduction in the volume of hardware. In addition, 54×3 normalization shifter 9 in the second stage also serves as a normalization shifter after rounding processing. Consequently, the amount of hardware is reduced to the amount in which a 54×54 normalization shifter is replaced with a 54×18 normalization shifter.

Moreover, the precision of priority encoder 2 in counting the number of zeroes may be on a three bit basis, which results in accomplishment of the smaller amount of hardware than that with a priory encoder on a single bit basis.

Figure 2:
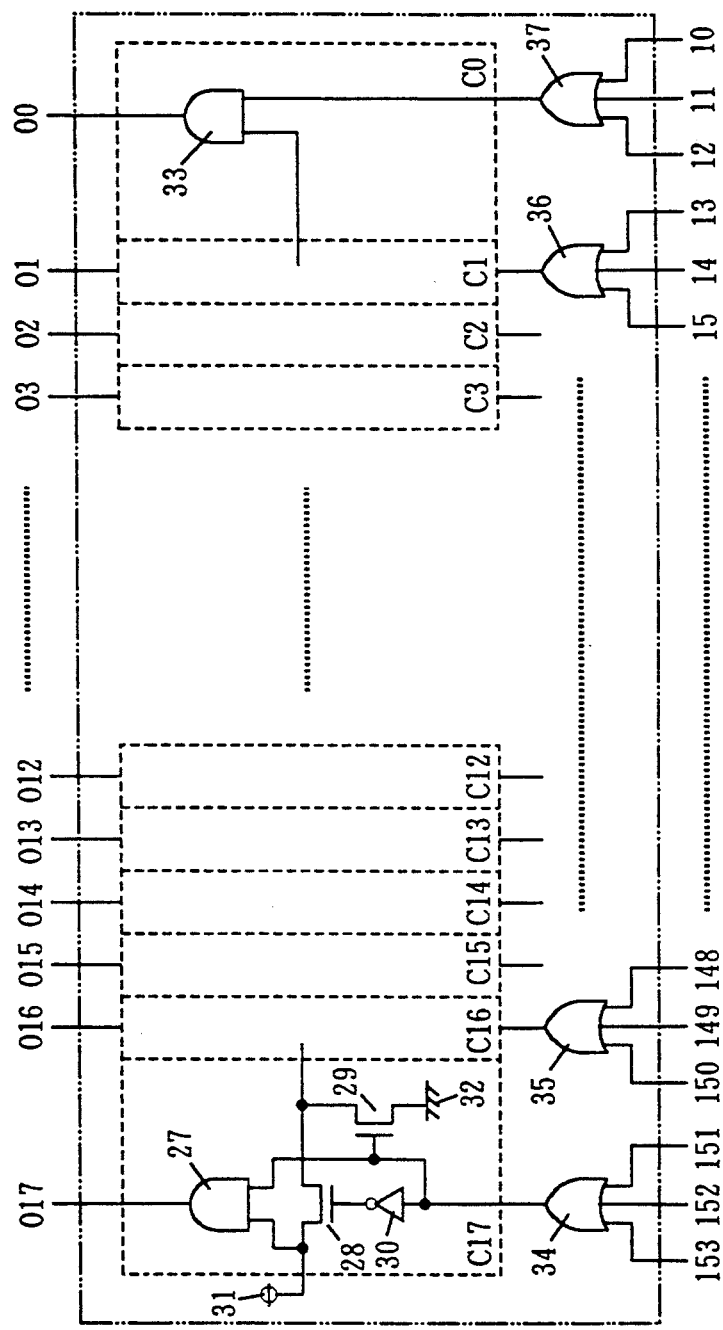
FIG. 2 is a schematic diagram showing in detail the circuit of the priority encoder shown in FIG. 1.

The priority encoder on a three bit basis can be implemented by a circuit shown in FIG. 2.

Figure 7:
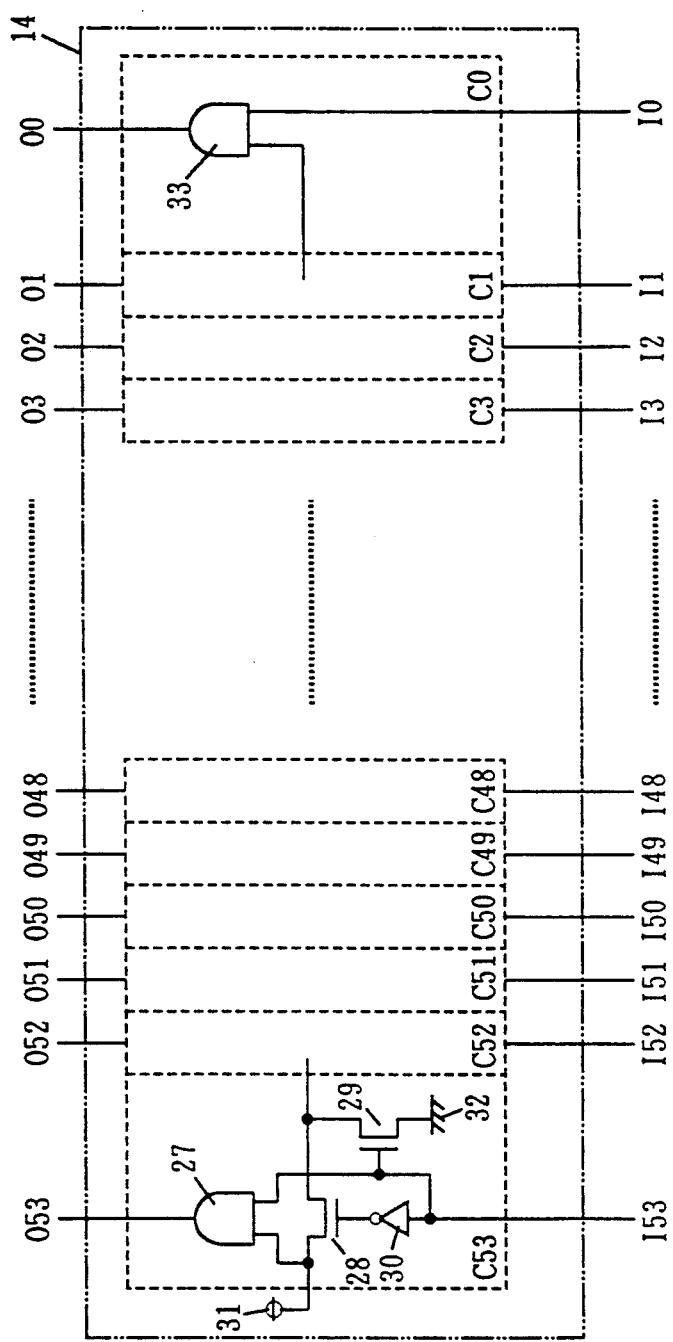
FIG. 7 is a schematic diagram showing in detail the circuit of the priority encoder on a single bit basis shown in FIG. 5.

Priority encoder 2 shown in FIG. 2 is different from priority encoder 14 shown in FIG. 7 in that the encoder circuits of fifty-four stages is replaced with encoder circuits C0-C17 of eighteen stages, and that a three-input OR gate is added for each stage. In FIG. 2, only four OR gates 34, 35, 36 and 37 are shown for simplification of the description.

In priority encoder 2 shown in FIG. 2, encoder circuits for eighteen bits may be sufficient. Accordingly, in spite of provision of three-input OR gates, the amount of hardware and the number of gate stages in the critical path are reduced, so that time required for encoding is also reduced. Therefore, increase in the number of stages of normalization shifters will not lead to lowering the speed of the arithmetic unit as a whole.

Figure 6:
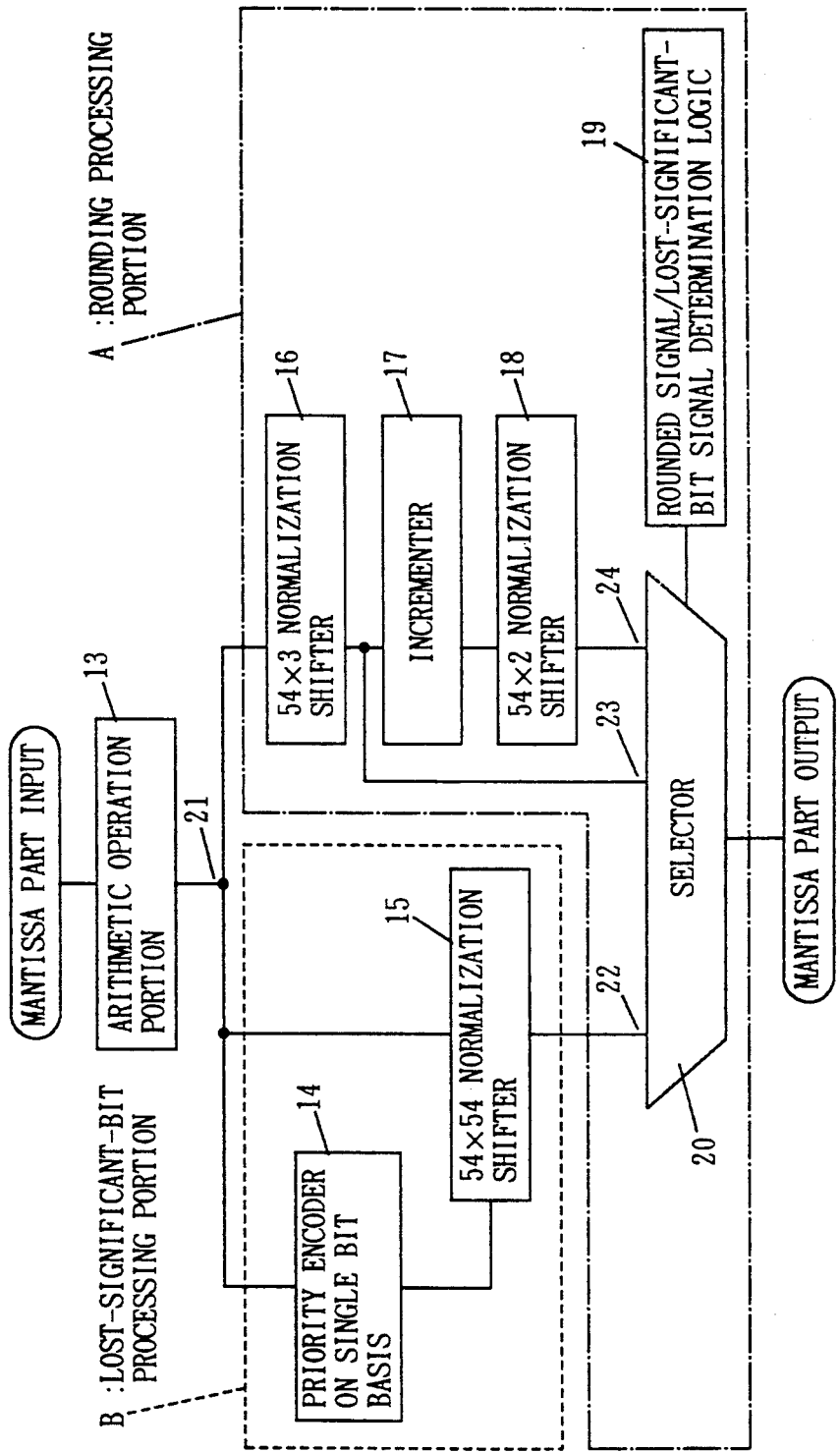
FIG. 6 is a block diagram showing operational processing block for a mantissa part in a conventional floating point arithmetic unit.

Turning back to FIG. 1, LSB determination logic 4 detects shift of the least significant bit (LSB) of an operation result due to overflow and 1-bit underflow by checking zeroes of the most significant three bits thereof, to determine the position of the LSB. For example, in the case of the sequence "011" in the most significant three bits, it determines that there is no overflow, in the case of the sequence "111", it determines that there is overflow, and in the case of the sequence "001", it determines that there is 1-bit underflow. Increment signal generating portion 5 generates an increment signal in which "1" is added to the LSB based on the determined result of LSB determination logic 4, to cut out bits lower than the LSB required for rounding determination logic. As a result, provision of the 54×2 normalization shifter shown in FIG. 6 and 54×3 normalization shifter 16 is not required, which lead to the smaller amount of hardware than that in the conventional device.

Three-bit input incrementer 6 can facilitate generation of a round-up signal in the case of shift of the LSB. Three-bit input incrementer 6 is shown in detail in FIG. 3.

Figure 3:
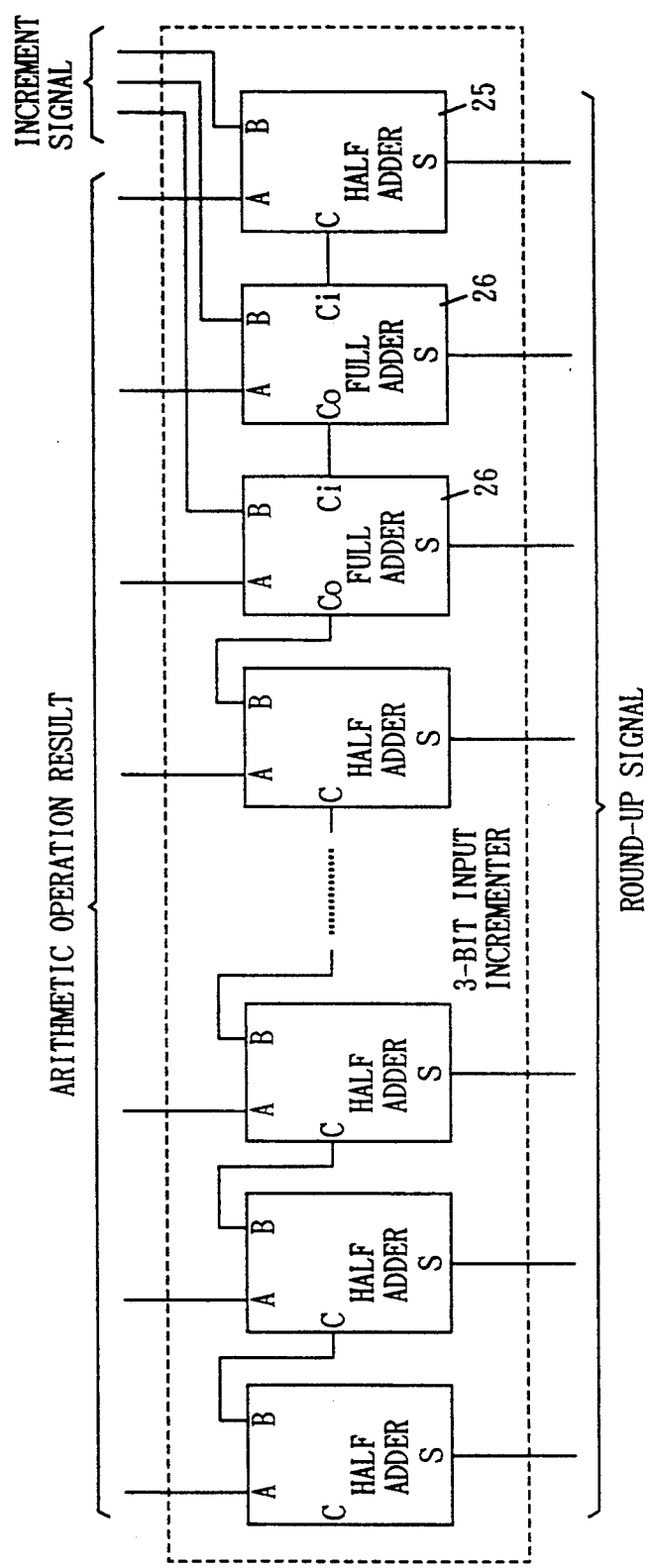
FIG. 3 is a schematic diagram showing the circuit of the three-bit input incrementer shown in FIG. 1.

Referring to FIG. 3, incrementer 6 is structured so that an increment signal of three bits is externally applied, respective bits of which are received by full adders 26 for the lower two bits and a half adder 25 for the least significant bit. Respective signals "001", "010", and "100" as increment signals correspond to shifts of the LSB due to overflow and 1-bit underflow. In FIG. 4, a calculation where a mantissa part is of eight bits is shown as one example.

Figure 5:
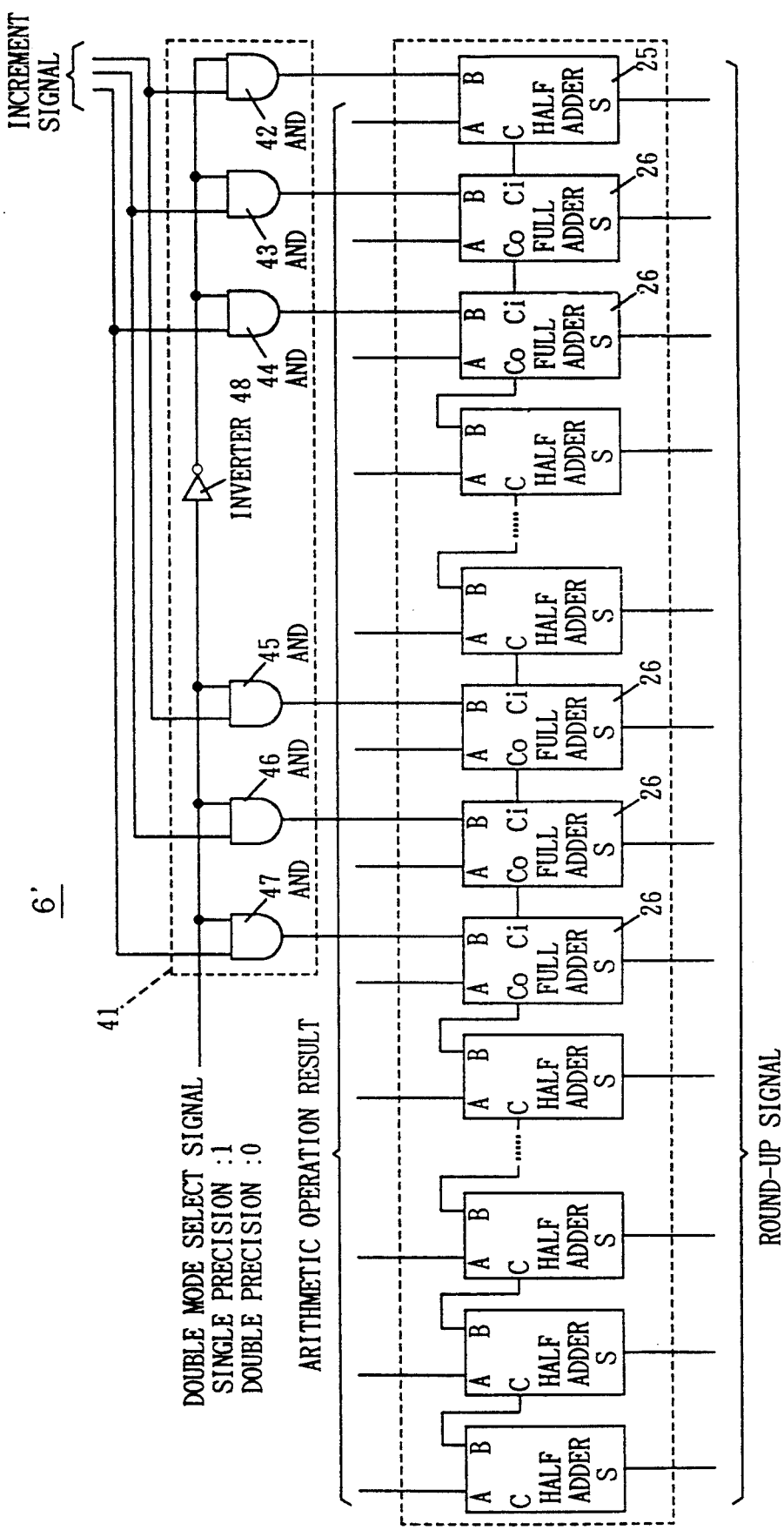
FIG. 5 is a block diagram showing another example of the three-bit input incrementer shown in FIG. 3.

FIG. 5 is a schematic diagram of a circuit showing another example of three-bit input incrementer 6 of FIG. 1. A three-bit input incrementer 6' shown in FIG. 5 is an incrementer enabling an arithmetic operation in both of a double precision mode and a single precision mode. Three-bit input incrementer 6' includes full adders 26 in place of half adders 25 corresponding to bits 28-30 shown in FIG. 3, and a selector 41 applying an increment signal to either of adders corresponding to bits 0-3 and full adders corresponding to bits 28-30, in response to a precision mode select signal externally applied.

In operation, selector 41 includes AND gates 42-47 and an inverter 48. A precision mode select signal externally applied is "0" in the double precision mode, and "1" in the single precision mode. When the double precision mode is selected, a precision mode select signal "0" is applied to AND gates 45-47, and a signal "1" obtained by inversion of the precision mode select signal by inverter 48 is applied to AND gates 42-44. AND gates 42-44 generate data for the lower three bits according to the logic for an increment signal to provide the generated data to the adders corresponding to bits 0-3. When the single precision mode is selected, a precision mode select signal "1" is applied to AND gates 45-47, and a signal "0" obtained by inversion of the single mode select signal by inverter 48 is applied to AND gates 42-44. AND gates 45-47 generate data for the lower three bits according to the logic for an increment signal to provide the generated data to the adders corresponding to bits 28-30.

Accordingly, three-bit input incrementer 6' shown in FIG. 5 can generate a round-up signal for data in both of the double precision mode and the single precision mode. Consequently, time for an arithmetic operation of data of less bits in the single precision mode can be reduced.

It should be noticed that the present invention can be employed not only for a double precision format of the IEEE standard for binary floating-point operation standard, but also for all rounding operations. As for change of the number of bits, 54 bits of a mantissa part in the double precision format of the IEEE standard for binary floating-point including a bit to be rounded may be replaced with any number of bits.

The arithmetic unit shown in FIG. 1 has a two-stage structure of 54×18 normalization shifter 3 and 54-3 normalization shifter 9. Basically, any number of bits not less than three bits may be applied to normalization shifters 3 and 9. Provided that a multiple input gate allows up to n (n is a positive integer) inputs to be applied thereto, an n-input gate is employed for OR logic in the first stage of a priority encoder so that the priority encoder is made on an n-bit basis, thereby reducing the amount of hardware, and thus the critical path of the encoder circuit. Additionally, normalization shifters in the next stage constitute a two stage structure of $54 \times m$ and $54 \times n$, where m is an integer within the range of $(54/n-1) > m \leq (54/n)$. Accordingly, so long as n does not exceed 27, the amount of hardware of the shifters is reduces as n becomes greater. For example, in the case of n=5, eleven five-input OR gates and an encoder circuit for eleven bits can constitute a priority encoder, so that normalization shifters 3 and 9 constitute a two stage structure of $54 \times 11$ and $54 \times 5$.

The normalization shifters for lost-significant bit processing portion B in the arithmetic unit shown in FIG. 1 constitute a two stage structure comprised of $54 \times 18$ normalization shifter 3 and $54 \times 3$ normalization shifter 9, while the normalization shifters may constitute any number of stages, and the normalization shifter in the final stage may serve as a part of rounding processing portion A.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A float point arithmetic unit including an arithmetic operation portion performing an arithmetic operation for a mantissa part of floating point data, comprising:

counting means for counting the number of zeroes arranged in sequence from the upper bit toward the lower bit in an operation result from which information is lost by said arithmetic operation, for each partial data of a plurality of bits;

first normalization means for normalizing said operation result from which information is lost in response to the counted result of said counting means;

rounding processing means for rounding the operation result considering overflow and underflow of the arithmetic operation result by said arithmetic operation portion; and second normalization means for normalizing the operation result normalized by said first normalization means or the operation result rounded by said rounding processing means.

2. The floating point arithmetic unit according to claim 1, wherein said counting means includes logical sum operation means for carrying out logical sum operation of said zeroes arranged in sequence from the most significant bit, for each plurality of bits.

3. The floating point arithmetic unit according to claim 2, wherein said counting means includes n/m encoder means, where n corresponds to the number of bits in a mantissa part, and m corresponds to the number of bits in said plurality of bits, and said encoder means transmits a prescribed potential in response to an output of said logical sum operation means.

4. The floating point arithmetic unit according to claim 3, wherein said plurality of encoder means corresponding to the most significant bit through the least significant bit are serially connected, each including switching means for turning on/off in response to an output of said logical sum operation means.

5. The floating point arithmetic unit according to claim 1, wherein said first normalization means includes shift means for shifting said arithmetic operation result towards the upper bit in response to the counted result of said counting means.

6. The floating point arithmetic unit according to claim 5, wherein said shift means includes shift means for shifting said arithmetic operation result, by a quotient of the number, n, of bits in said mantissa part divided by the number, m, of said plurality of bits.

7. The floating point arithmetic unit according to claim 1, wherein said rounding processing means includes detecting means for determining a logic state of the most significant three bits of said arithmetic operation result to detect change of the least significant bit by overflow or underflow in said arithmetic operation.

8. The floating point arithmetic unit according to claim 7, wherein said rounding processing means includes round-up data generating means for generating round-up data for rounding processing in response to the amount of change of the least significant bit detected by said detecting means.

9. The floating point arithmetic unit according to claim 7, wherein said round-up data generating means includes normalization means for incrementing "1" at the least significant bit of said arithmetic operation result to normalize said arithmetic operation result, and data adding means for adding data for rounding processing to the least significant three bits of the arithmetic operation result normalized by said normalization means.

10. The floating point arithmetic unit according to claim 9, wherein said data adding means includes three-bit increment means for applying "100" to said the least significant three bits in the case of overflow, applying "001" to the least significant three bits in the case of underflow, and applying "010" to the least significant three bits otherwise, to generate a round-up signal.

11. The floating point arithmetic unit according to claim 10, wherein said three-bit increment means includes, in an operation of data formed of (n+1) bits including said mantissa part (n bits) and a guard bit for rounding processing, half adder means provided for the most significant bit through the (n-2)th bit and the least significant bit, and full adder means provided for the (n−1)th and nth bits.

12. The floating point arithmetic unit according to claim 11, wherein said three-bit increment means includes full adders in the (j−1)th, jth and (j+1)th bit positions corresponding to a data format with a mantissa part of j bits, where j<n.

13. The floating point arithmetic unit according to claim 7, wherein said rounding processing means includes selector means for selecting either the operation result normalized by said first normalization means, or the round-up data generated by said round-up data generating means, in response to said detecting means.

14. A floating point arithmetic unit including an arithmetic operation portion performing an arithmetic operation for a mantissa part of floating point data, comprising:

counting means for counting the number of zeroes arranged in sequence from the upper bit toward the lower bit of an operation result from which information is lost by said arithmetic operation, for each partial data of a plurality of bits;

first normalization means for normalizing said operation result from which information is lost in response to the counted result of said counting means;

detecting means for determining a logic state of the most significant three bits of the arithmetic operation result by said arithmetic operation portion to detect change of the least significant bit by overflow or underflow in said arithmetic operation;

round-up data generating means for adding "1" corresponding to said detected change of the least significant bit to generate round-up data for rounding processing;

selector means for selecting the operation result normalized by said first normalization means or the round-up data generated by said round-up data generating means; and second normalization means for normalizing the selected data by said selector means.

* * * * *